United States Patent [19]

Nichols

[11] Patent Number: 4,528,697
[45] Date of Patent: Jul. 9, 1985

[54] BROADBAND QUADRATURE PHASE MODULATOR FOR CONTROL LOOP ERROR GENERATION IN AN IF COMBINER

[75] Inventor: Richard A. Nichols, Richardson, Tex.

[73] Assignee: Rockwell International Corporation, El Segundo, Calif.

[21] Appl. No.: 498,369

[22] Filed: May 26, 1983

[51] Int. Cl.³ .......................... H04B 1/16; H04B 7/02
[52] U.S. Cl. .................................... 455/139; 455/304
[58] Field of Search ........................ 455/52, 137–139, 455/276, 278, 303, 304; 375/100

[56] References Cited

U.S. PATENT DOCUMENTS

| | | | |
|---|---|---|---|
| 3,835,392 | 9/1974 | Mahner et al. | 455/138 |
| 4,079,318 | 3/1978 | Kinoshita | 455/139 |
| 4,261,056 | 4/1981 | Barnett et al. | 455/139 |
| 4,334,316 | 6/1982 | Tanaka | 455/139 |
| 4,354,276 | 10/1982 | Karabinis | 455/139 |

Primary Examiner—Jin F. Ng
Attorney, Agent, or Firm—V. Lawrence Sewell; Howard R. Greenberg; H. Fredrick Hamann

[57] ABSTRACT

Circuitry for use in an IF combiner, where main and diversity receiver path signals are combined. The circuitry generates an error signal for the purpose of controlling the phase of one of these signals by deriving a broad-band phase-modulated feedback path version of the signal. No modulation is introduced into the message channel. The feedback path version of the signal is quadrature modulated and combined with signals from the main and diversity receiver paths to generate an error signal providing maximum control loop sensitivity.

11 Claims, 5 Drawing Figures

BROADBAND QUADRATURE PHASE MODULATOR FOR CONTROL LOOP ERROR GENERATION IN AN IF COMBINER

BACKGROUND OF THE INVENTION

This invention relates to a circuit for generating an error in a control loop for an IF combiner, and more particularly to a circuit capable of providing a broadband quadrature phase-modulated signal for such a control loop.

The present invention finds particular application in a high density space diversity radio system. Such a system is used to improve reliability in a microwave radio, as a solution to the problem of frequency selective fading due to multipath propagation. Reliability is improved by combining signals received by separate antennas. Circuitry according to the present invention can be used to control the phase of IF signals from two different receivers with respect to each other, so that the two signals can be combined in phase or in accordance with other combining strategies.

A prior art combiner employs a common local oscillator for two down-converters and space diversity receivers. The local oscillator output going to the down-converter which is to be phase shifted is controlled by a narrow-band phase shifter. A control loop senses the output of the combiner and controls the phase shifter. A small amount of phase modulation is introduced into the message channel so as to produce an amplitude modulation from which the control loop can detect the phase error between main and diversity receivers. This technique uses band-sensitive and expensive radio frequency components.

Another prior method of phase shifting employs side-step conversion on an IF signal. This method is similar to the previously described one, except that it uses an up-converter and a down-converter. The local oscillator for the side-step conversion is split and, as in the prior technique, one side is narrow-band phase shifted. This method can be used at a common IF frequency, regardless of the R.F. band of the receiver. Unfortunately, the method gives rise to high spurious products in the IF output and is extremely bad for high density FM receivers.

These prior art IF combiners have a number of limitations. Importantly, as a result of their operation, a small modulation is introduced into the message channel.

Finally, since the modulation used to permit detection of an error signal in the prior art methods is introduced into the message channel, it can only be a very small modulation. This limits the sensitivity of the error detection process.

SUMMARY OF THE INVENTION

In accordance with the present invention, there is provided circuitry for use in an IF combiner to generate from the main or diversity receiver paths an error signal for controlling the phase of the signal in one of those paths. The circuitry derives a phase-modulated feedback path version of the signal in one of the receiver paths, without introducing any modulation into those paths. The error signal generation circuitry includes broad-band magnitude control and phase reversal circuits to derive the feedback path version of the signal, phase modulated ±90°.

A principal advantage of the invention is that it does not introduce modulation into the message channels, that is the main or diversity receiver paths.

Moreover, it permits phase alignment of the main and diversity receiver signals based on comparison over a broad frequency band.

In addition, the quadrature (±90°) phase modulation employed in the feedback path provides maximum sensitivity for detecting phase differences in the main and diversity receiver paths.

DESCRIPTION OF A PREFERRED EMBODIMENT

Figure 1:
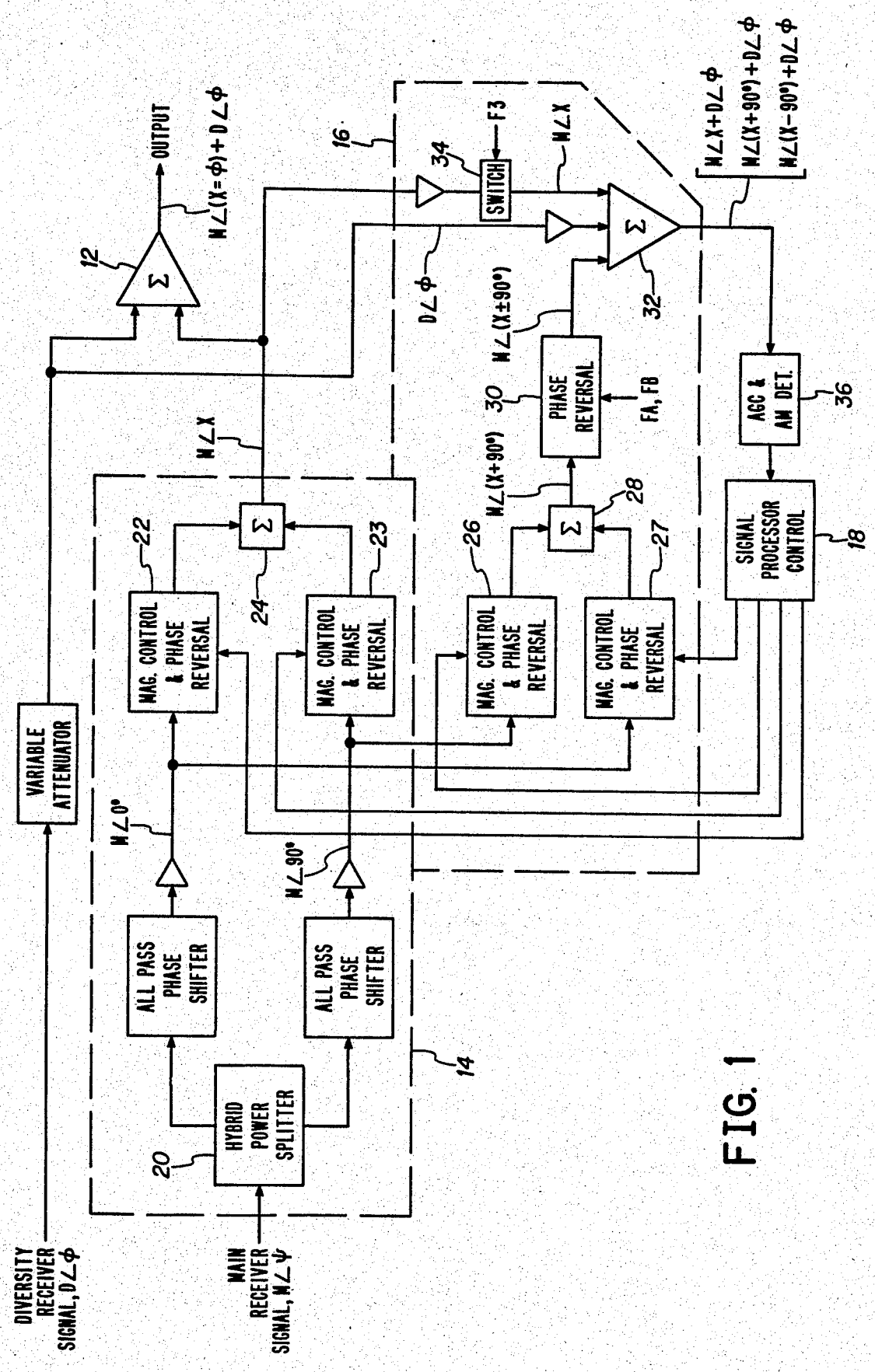
FIG. 1 is a block diagram of an IF combiner in accordance with the principles of the invention.

FIG. 1 illustrates an IF combiner in accordance with the invention. The inputs to the apparatus of FIG. 1 are the diversity receiver signal D having a phase designated by $\phi$ and the signal from the main receiver signal M with a phase $\psi$. These inputs are to be phase aligned and combined at a power combiner 12. Either of the receiver paths may have its phase controlled, but in FIG. 1, it is the main receiver signal M which is controlled by a phase shifter 14. An error signal generator 16 and signal processor control 18 control the shift introduced by phase shifter 14 so that the inputs to power combiner 12 are phase aligned.

Figure 5:
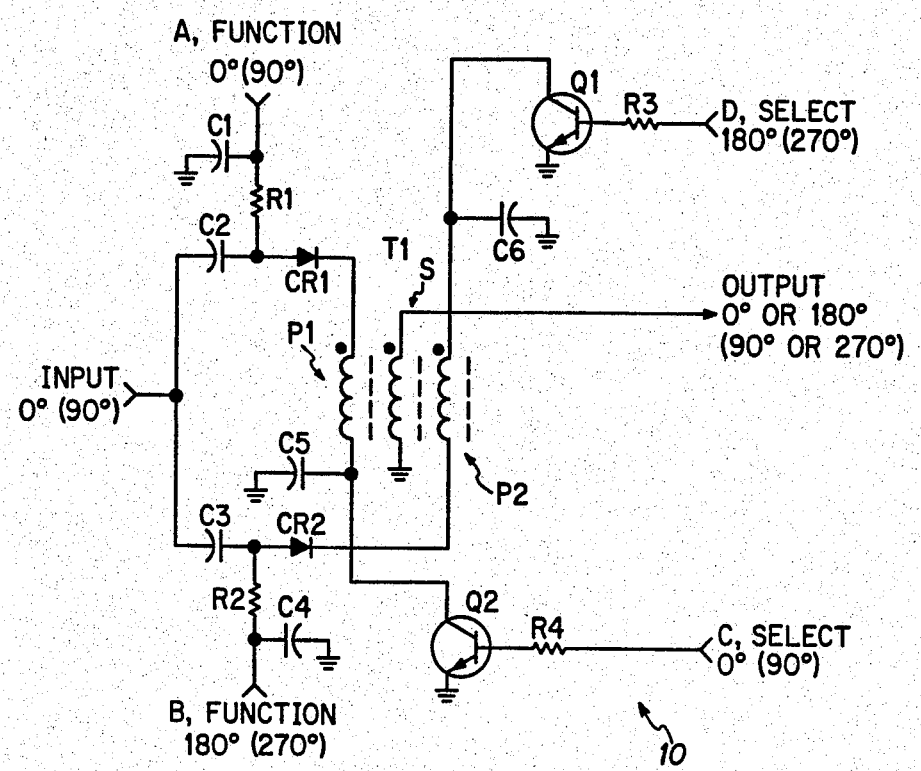
FIG. 5 is a schematic diagram of a magnitude control and phase reversal circuit used in FIG. 1.

A component of both phase shifter 14 and error signal generator 16 is a magnitude control and phase reversal circuit of the type shown in FIG. 5. This circuit, as well as phase shifter 14, is the subject of my patent application Ser. No. 454,137, filed Dec. 28, 1982 and entitled "Phase Shifter for Broadband Radio Signal". A broad description of the operation of the magnitude control and phase reversal circuit shown in FIG. 5 is as follows. Depending upon which of SELECT inputs C or D is activated, the output of the circuit will be an inverted or noninverted version of the input signal. Moreover, the magnitude of the output signal is controlled by the magnitude of FUNCTION inputs A and B.

As is described in the referenced patent application, the phase shifter 14 employs a hybrid power splitter 20 to produce versions of the main receiver signal M which are 90° different in phase. These signals are applied to magnitude control and phase reversal circuits 22 and 23. Inputs to circuits 22 and 23 from signal processor control 18 establish magnitude and phases of the signals so that the outputs of circuits 22 and 23 are the components of the signal of the desired phase for combining with diversity signal D. These components from circuits 22 and 23 are summed by combiner 24. The phase shifter 14 is a broad-band device, so that the phase of the main signal M considered over a broad band will be shifted into alignment with the overall phase of diversity signal D over that frequency band.

Error signal generator 16 takes as two of its inputs the two main receiver signals, 90° out of phase from phase shifter 14. These form inputs to magnitude control and phase reversal circuits 26 and 27. The outputs of circuits 26 and 27 are summed by combiner 28. Magnitude control and phase reversal circuits 26 and 27 are controlled by signal processor control 18 so that the output of combiner 28 is the same as the output of combiner 24 in phase shifter 14, except shifted by 90°. The output of combiner 28 may be 90° ahead of the output of combiner 24, as indicated in FIG. 1, or it may be 90° behind, but whichever phase difference is selected, the phase difference is constant and does not change with time. The manner in which magnitude control and phase reversal circuits 26 and 27 and combiner 28 provide the desired phase shift is the same as that of circuits 22, 23 and 24 in phase shifter 14, as described herein and in the referenced patent application.

The output of combiner 28 is input to phase reversal circuit 30. The operation of phase reversal circuit 30 is to provide at its output alternately inverted and noninverted versions of the signal at its input. This will be a signal which is alternately 90° ahead of the output of combiner 24 or 90° behind it. Phase reversal circuit 30 can be implemented using the circuit of FIG. 5. At first, it would seem that the SELECT inputs would be switched to provide the alternating phase reversal. However, it was found experimentally that this caused undesirable switching transients.

Figure 2:
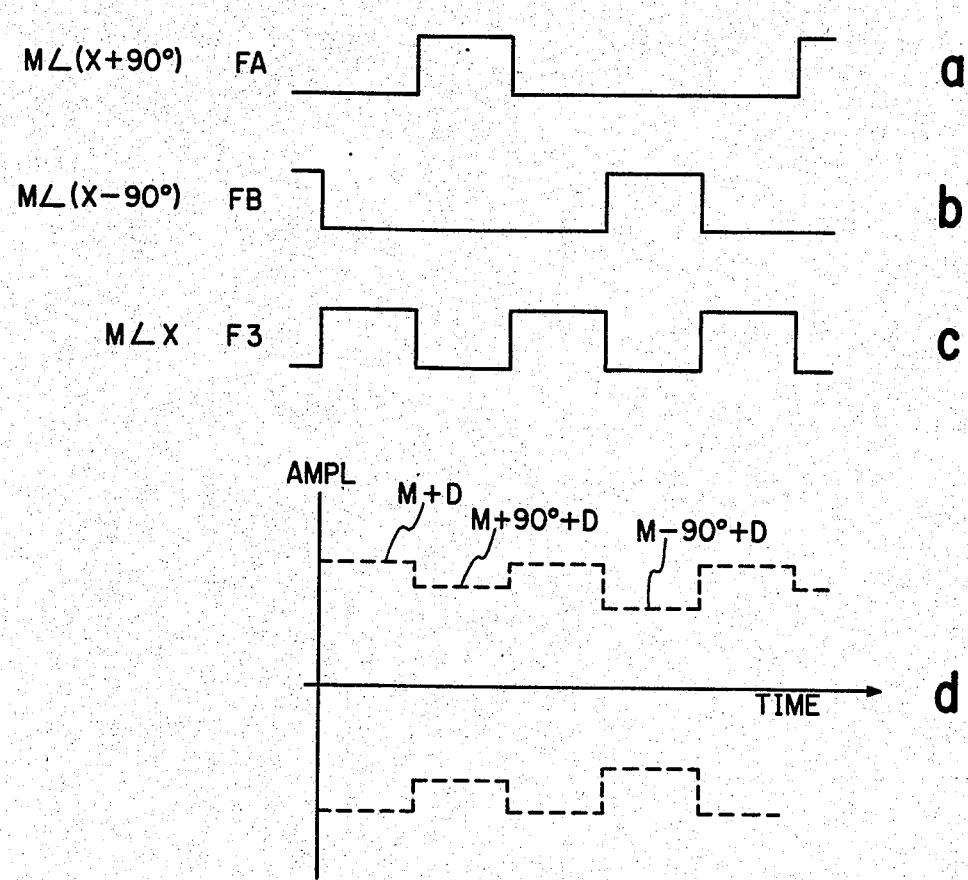
FIG. 2 is a collection of timing diagrams illustrating the operation of the combiner of FIG. 1.

It was found desirable to use an operation in which either transistors Q1 and Q2 are turned on all the time, or replaced by a connection to ground. Then the function inputs A and B are alternated so as to provide the desired inversion and noninversion. That is, as illustrated further in FIGS. 2a and b, a function input FA applied to the FUNCTION A input goes high at a time when an input FB, applied to the FUNCTION B input, is held low. This causes the input to the phase reversal circuit to pass through noninverted. Then, alternately, FB is high, when FA is low, resulting in an inversion of the signal through circuit 30. Because of the requirements of the next part of the error loop, there is a period between the times that FA and FB are high, that neither is high, allowing no signal through phase reversal circuit 30.

The output of phase reversal circuit 30 is summed by device 32 with the signal D from the diversity receiver path and a switched version of the signal M from the main receiver path. The switching of M is controlled by input F3 at switch 34. As illustrated in FIG. 2c, switch 34 is closed by input F3 going high during the periods when neither FA nor FB is high. During these periods, since the output of phase reversal circuit 30 is zero, the sum is simply M+D. FIG. 2d illustrates the amplitude variation of the sum output of device 32 during these various switching intervals. In that portion of the figure, the sum output when F3 is high is M+D as described. When FA is high and F3 is low, the sum output is M+90°+D. When FB is high and F3 is low, the sum output is M−90°+D.

Figure 3:
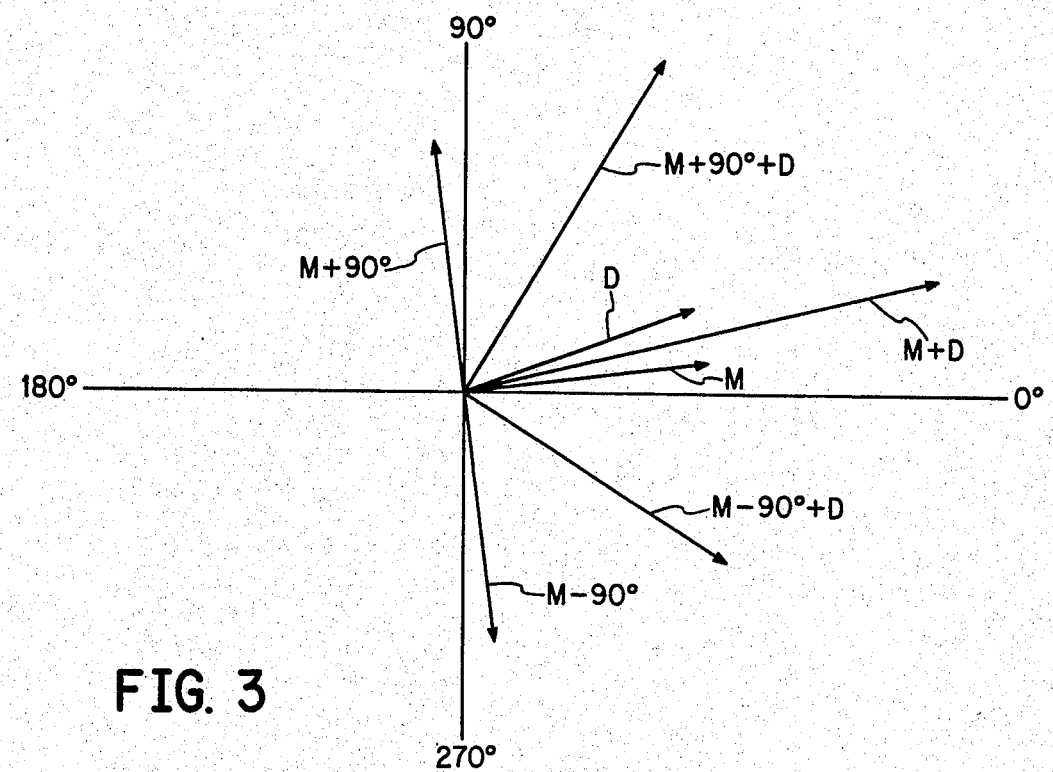
FIG. 3 is a vector diagram illustrating possible vector relationships of quantities shown in FIG. 2.

FIG. 3 illustrates the vector relationships underlying the information in the output of error signal generator 16. The figure shows main signal M and diversity signal D, having the same magnitude, but differing somewhat in phase, exaggerated for purposes of illustration. As illustrated, the vector sum M+D is almost twice as long as M or D. The vectors M+90° and M−90° are of course perpendicular to the vector M. The vector sum of M+90° and D is the vector labeled M+90°+D. Also shown is the result of the vector addition of M−90° and D.

There is a significant difference between the length of the two vectors M+90° and M−90°+D. This difference shows up in the sum output of device 32, the signal envelope of which is illustrated in FIG. 2d, with appropriately labeled intervals.

The way that signal processor control 18 utilizes the information of FIG. 2d is to interpret any difference between M+90°+D and M−90°+D as indicating a difference in phase between D and M.

Differences in phase between D and M are accentuated in differences between M+90°+D and M−90°+D, because M+90° and M−90° are each almost 90° away from D. Indeed, the quadrature phase modulation generated by magnitude control and phase reversal circuits 26 and 27 and phase reversal circuit 30 provides the highest degree of sensitivity in detecting differences in phase between M and D.

In prior art systems, where phase modulation is introduced in the message channel, such as the main receiver path, the modulation must be kept small. As a result, the sensitivity in such a loop to phase differences between D and M is very significantly smaller than that illustrated by FIGS. 2 and 3.

Since the magnitude control and phase reversal circuits as illustrated in FIG. 5, along with other elements of the error signal generator are broad-band elements, the sum provided by device 32 is a sum of broad-band signals. Thus, the phases of main and diversity signals M and D, and differences between these phase, are actually composites of the phases associated with a broad band of frequencies.

The sum from combining device 32 is, thus, an amplitude modulated IF signal. At circuit 36, this signal is automatic gain controlled, narrow band filtered and envelope detected to recover the error signal. The AM detected signal is then provided to signal processor control 18, which controls magnitude control and phase reversal circuits 22, 23, 26 and 27, along with phase reversal circuit 30 and switch 34.

Figure 4:
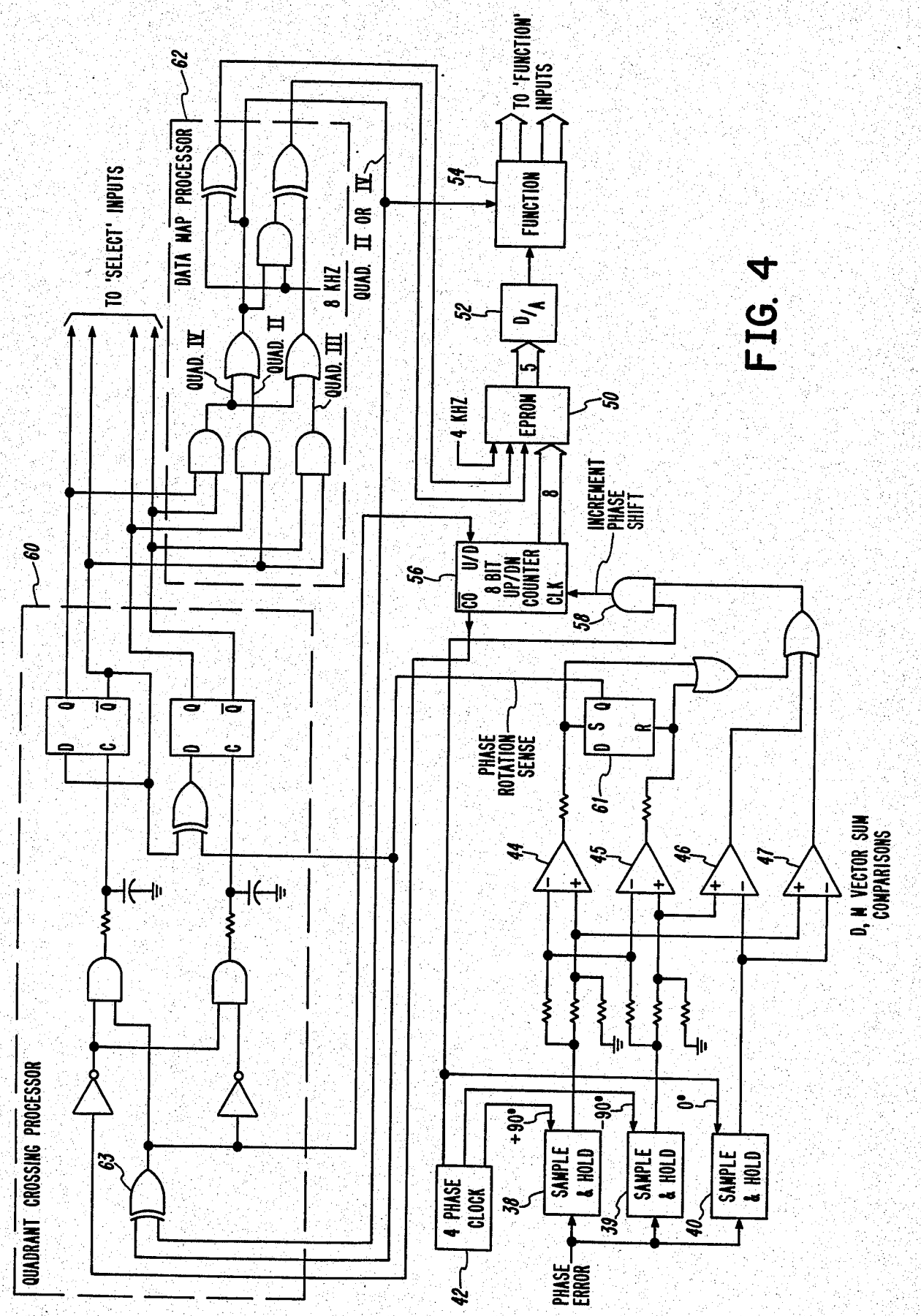
FIG. 4 is a schematic diagram of a signal processor control circuit in the combiner of FIG. 1.

Details of signal processor control 18 are shown in FIG. 4. The detected phase error is input to sample-and-hold circuits 38, 39 and 40. These are controlled by four phase clock 42, which also controls the switching waveforms FA, FB and F3 of phase reversal circuit 30 and switch 34 in FIG. 1. Clock 42 samples and holds the amplitude during the various intervals illustrated in FIG. 2d. The magnitude and sense of the sample and hold error are recovered by ratio comparison of the M+90°+D and M−90°+D vectors at amplifiers 44 and 45. A resistive threshold circuit at the input of these amplifiers inhibits correction for errors of less than 5° with equal received signal levels, in order to prevent needless hunting. Because of this dead zone, it is also necessary to compare M+D with the latter vectors at amplifiers 46 and 47 to preclude lockup at 180° combining.

All phases of the IF combiner described herein depend on the magnitude control and phase reversal circuits of the kind shown in FIG. 5. Proper operation of these circuits depends upon the characteristics of the PIN diodes used in them. In the fabrication of a combiner according to the invention, the diode characteristics should be matched. Then the diode set can be computer characterized at the assembled module level, with the normalizing data stored in EPROM 50 of FIG. 4. Thus, the correct FUNCTION inputs for producing every output phase angle can be recalled from memory, converted to the correct analog control function voltage by digital-to-analog converter 52 and applied to the appropriate PIN diode through analog function demultiplexer 54. The addressing of EPROM 50 is accomplished by an eight bit up/down counter 56.

This process of using stored normalizing data produces a constant output signal level at a known phase. It enables the signal phase to be rotated by an arbitrary number of degrees, without producing spurious signals and with almost negligible degradation to the frequency response.

Thus, when amplifiers 44–47 and associated logic detect that the main receiver signal M and diversity receiver signal D are out of phase, counter 56 is provided with a command to increment up or down, depending on which direction the phase of M must be changed to match that of D. Each count total which the counter 56 generates represents an address in EPROM 50, which contains FUNCTION inputs for circuits 22 and 23 (FIG. 1) to produce a particular phase shift from phase shifter 14. The address in EPROM 50 also provides FUNCTION inputs to circuits 26 and 27 of error signal generator 16 to produce a phase shift 90° different from that in phase shifter 14.

In EPROM 50, each phase quadrant is defined by 256 address words. Because of rate-of-phase change limitations in digital radio applications, the output phase vector must rotate through each incremental phase state between its present phase the the desired phase. The loop is rate limited to 3600° per second, which is established by the up/down counter clock frequency.

Counter 56 is clocked by the output of AND gate 58, which depending upon the phase comparisons of amplifiers 44–47 gives the command to increment the phase shift in phase shifter 14 of FIG. 1. For a given direction of output vector rotation, counter 56 must change directions at the quadrant crossings. It is therefore necessary to process the phase rotation sense output of flip-flop 60 to give the counter 56 proper direction, depending upon the current resident quadrant of the output vector. Quadrant crossing processor 60 receives the phase rotation sense, the output of counter 56 and an indication of the current quadrant, and it computes the SELECT inputs for the magnitude control and phase reversal circuits. Because of the 90° phase relationship between the output of phase shifter 14 in the main receiver path and the output of combiner 28 in the feedback path, the four outputs of quadrant crossing processor 60 are connected to the SELECT inputs of magnitude control and phase reversal circuits 22 and 23 (FIG. 1) and are connected differently to the SELECT inputs of circuits 26 and 27. The outputs of processor 60 are also taken by data map processor 62 to compute the current quadrant location and related additional address bits for EPROM 50. Exclusive OR gate 63 in quadrant crossing processor 60 generates the up/down direction for counter 56.

Knowledge of the current quadrant of phase shifter 14 is also necessary in order to properly access data in EPROM 50. In any given quadrant, there are data for four PIN diodes which must be accessed in proper sequence to be processed by the digital-to-analog output function demultiplexer 54. Analog function demultiplexer 54, receiving the quadrant information from data map processor 62 and the output of digital-to-analog converter 52 supplies the function inputs to the magnitude control and phase reversal circuits 22, 23, 26 and 27, all of FIG. 1.

Thus, the present invention provides for broadband IF combining, without the introduction of modulation into the message channel. Quadrature modulation is used in a feedback path to generate an error signal providing maximum sensitivity to phase differences between the diversity and main receiver signals.

I claim:

1. Circuitry for use in an IF combiner having means for combining signals of first and second receiver paths, such as main and diversity receiver paths, with one of said paths including means for controlling the phase of the signal therein, thereby to provide the signal, with a controlled phase designated as X, to said means for combining, the signal in the other of said paths having a phase designated as $\phi$, said circuitry comprising:

means for deriving from said first receiver path a broadband phase-modulated version of a signal in said first path modulated alternately by a selected modulating phase angle and the inverse of said phase angle; and means, responsive to said phase modulated version and to signals of said first and second receiver paths with phases $\phi$ and X, for providing the sum of said signals with phases $\phi$ and X and said modulating angle, providing the sum of said signals with phases $\phi$ and X and said inverse of the phase angle, separately providing the sum of signals with phases $\phi$ and X, and using all of said sums to derive an error signal for said means for phase controlling, including information as to the difference in phase of the signals to be combined.

2. Circuitry for use in an IF combiner having means for combining signals of first and second receiver paths, such as main and diversity receiver paths, with one of said paths including means for controlling the phase of the signal therein, thereby to provide the signal, with a controlled phase designated as X, to said means for combining, the signal in the order of said paths a phase designated as $\phi$, said circuitry comprising:

means for deriving from said first receiver path a broadband phase-modulated version of a signal in said first path modulated alternately by a phase angle of $+90°$ and $-90°$; and means, responsive to said phase modulated version and to the signals of said receiver paths with phases $\phi$ and X, for providing an error signal for said means for phase controlling, including information as to the difference in phase of the signals to be combined.

3. The circuitry of claim 2, wherein said means for providing said error signal includes means for summing said phase modulated version, and said signals of the receiver paths with phases $\phi$ and X.

4. The circuitry of claim 2, wherein said means for deriving includes:

means for providing a broadband constant phase shifted version of the signal in said first receiver path, said constant phase shift having a magnitude selected from $(X+90°)$ and $(X-90°)$, and means for periodically inverting the constant phase shifted version, thereby to provide a broadband quadrature phase modulated version of the signal in said first receiver path.

5. The circuitry of claim 4, wherein said means for inverting the constant phase shifted version of the signal receives said phase shifted version as a broadband radio signal input and comprises:

first and second paths, each including a PIN diode receiving said radio signal at a first terminal thereof, and a transformer primary winding connected by a first terminal thereof to the second terminal of the diode;

first and second means, each connected to respective ones of said diodes, each having a separate function control input and including a resistance connected between said function control input and the first terminal of the respective diode, for providing to the respective diode a bias according to the associated function control input and thereby providing said radio signal at the second terminal of the diode scaled by an attenuation factor in accordance with the associated function control input; and a transformer secondary winding connected to couple from one of said first primary windings to an output of said circuit in a noninverted fashion and to couple from the other primary winding in an inverted fashion.

6. The circuitry of claim 4, wherein said means for providing a constant phase shifted version of the signal includes:

means in said first receiver path for deriving two auxiliary signals separated by a 90° phase shift;

first magnitude control and phase reversal means, responsive to one of said auxiliary signals, for deriving therefrom a first component of the constant phase shifted version;

second magnitude control and phase reversal means, responsive to the other of said two auxiliary signals for providing a second component of said constant phase shifted version; and means for combining said two components.

7. The circuitry of claim 6, wherein each of said magnitude control and phase reversal means receives one of said two auxiliary signals as an input radio signal and comprises:

first and second variable means, each receiving said radio signal and each having a separate function control input, for providing said radio signals scaled by a factor in accordance with the associated function control input;

means, having a select input for selecting said second variable means;

means, in response to the selection of said second variable means, for inverting the signal provided thereby and delivering the inverted signal as an output of said circuit;

means, having a select input, for selecting said first variable means, and noninverting means, in response to the selection of said first variable means, for delivering the signal provided by said first variable means as an output of said circuit.

8. The circuitry of claim 7, wherein each of said variable means includes a PIN diode receiving said radio signal and means for biasing said diode according to the associated function control input.

9. The circuitry of claim 7, wherein said noninverting means includes a transformer primary winding receiving said radio signal provided by said first variable means, said means for inverting includes a second transformer primary winding receiving said radio signal provided by said second variable means, and said means for inverting and said noninverting means include a transformer secondary winding connected to deliver to the circuit output the signal from the first primary winding in a noninverted fashion and to deliver in an inverted fashion the signal from the second primary winding.

10. The circuitry of claim 7, wherein each of said variable means includes a PIN diode receiving said radio signal and means for biasing said diode according to the associated function control input, and said circuitry further includes memory means for storing data incorporating the individual characteristics of said PIN diodes, said data to be used in controlling said first and second magnitude control and phase reversal means.

11. Circuitry for use in an IF combiner having means for combining signals of first and second receiver paths, such as main and diversity receiver paths, with one of said paths including means for controlling the phase of the signal therein, thereby to provide the signal, with a controlled phase designated as X, to said means for combining, the signal in the other of said paths having a phase designated as $\phi$, said circuitry comprising:

means for deriving from said first receiver path a broad-band constant phase shifted version of a signal in said first path, said constant phase shift having a magnitude selected from $(X+90°)$ and $(X-90°)$, means for periodically inverting the constant phase shifted version of the signal, thereby to provide a broad-band quadrature phase-modulated version of the signal in said first receiver path, and means, responsive to said broad-band quadrature phase-modulated version and to the signals of said receiver paths with phases $\phi$ and X, for providing an error signal for said means for controlling the phase of the signal in one of said receiver paths.

* * * * *